(12) United States Patent
Wu

(10) Patent No.: US 11,166,195 B2
(45) Date of Patent: Nov. 2, 2021

(54) METHOD AND APPARATUS OF DATA PROCESSING FOR DELIVERING PACKET DATA CONVERGENCE PROTOCOL (PDCP) PACKET DATA

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 29 days.

(21) Appl. No.: 16/611,013

(22) PCT Filed: May 2, 2018

(86) PCT No.: PCT/CN2018/085356
§ 371 (c)(1),
(2) Date: Nov. 5, 2019

(87) PCT Pub. No.: WO2018/202047
PCT Pub. Date: Nov. 8, 2018

(65) Prior Publication Data
US 2020/0084664 A1 Mar. 12, 2020

(30) Foreign Application Priority Data
May 5, 2017 (CN) .......................... 201710314137.8

(51) Int. Cl.
H04W 28/06 (2009.01)
H04L 12/801 (2013.01)
H04W 80/04 (2009.01)

(52) U.S. Cl.
CPC ........... *H04W 28/065* (2013.01); *H04L 47/34* (2013.01); *H04W 80/04* (2013.01)

(58) Field of Classification Search
CPC ... H04W 28/06; H04W 28/065; H04W 80/02; H04W 80/04; H04W 47/34; H04W 69/04;
(Continued)

(56) References Cited

U.S. PATENT DOCUMENTS 8,958,422 B2 2/2015 Celik et al.
2009/0016301 A1 1/2009 Sammour et al.
(Continued)

FOREIGN PATENT DOCUMENTS

CN 102711197 A 10/2012
CN 103201977 A 7/2013
(Continued)

OTHER PUBLICATIONS

EP Search Report in Application No. 18793806.3 dated Mar. 23, 2020.
(Continued)

*Primary Examiner* — Mewale A Ambaye
(74) *Attorney, Agent, or Firm* — Maschoff Brennan

(57) ABSTRACT

A method and an apparatus of data processing, applied to a packet data convergence protocol (PDCP) layer, are provided. The method includes: reordering a received PDCP data packet according to a serial number of the PDCP data packet; determining whether the serial number of the reordered PDCP data packet is inside or outside a Reordering_Window, delivering the reordered PDCP data packet to a robust header compression (RoHC) entity in a serial number order of the reordered PDCP data packet, and obtaining a data packet resulting from header decompression performed by the RoHC entity on the PDCP data packet.

20 Claims, 6 Drawing Sheets

(58) Field of Classification Search
CPC ...... H04W 8/00; H04L 49/9057; H04L 69/32; H04L 47/34
See application file for complete search history.

(56) References Cited

U.S. PATENT DOCUMENTS

| | | | |
|---|---|---|---|
| 2012/0281564 A1* | 11/2012 | Zhang | H04L 1/08 370/252 |
| 2013/0170496 A1 | 7/2013 | Kim et al. | |
| 2013/0242859 A1 | 9/2013 | Celik et al. | |
| 2015/0215827 A1 | 7/2015 | Zhang et al. | |
| 2015/0215987 A1 | 7/2015 | Kim et al. | |
| 2016/0241685 A1 | 8/2016 | Shah et al. | |
| 2016/0374036 A1 | 12/2016 | Wang et al. | |
| 2017/0085492 A1 | 3/2017 | Xiao et al. | |
| 2018/0098241 A1* | 4/2018 | Callard | H04L 47/34 |
| 2018/0124767 A1* | 5/2018 | Shaheen | H04W 72/0406 |
| 2018/0287747 A1* | 10/2018 | Lee | H04L 1/1896 |
| 2018/0359801 A1* | 12/2018 | Kim | H04W 28/065 |
| 2019/0021026 A1* | 1/2019 | Iskander | H04W 28/085 |
| 2019/0090156 A1* | 3/2019 | Kim | H04L 69/04 |
| 2019/0097936 A1* | 3/2019 | Yang | H04W 28/0268 |
| 2019/0306745 A1* | 10/2019 | Kim | H04L 1/18 |
| 2020/0351712 A1* | 11/2020 | Kim | H04L 69/04 |

FOREIGN PATENT DOCUMENTS

| | | |
|---|---|---|
| CN | 104272796 A | 1/2015 |
| CN | 104519524 A | 4/2015 |
| CN | 104812000 A | 7/2015 |
| CN | 104935413 A | 9/2015 |
| CN | 105704197 A | 6/2016 |

OTHER PUBLICATIONS

Wenbo et al., "Design and Implementation of PDCP Protocol in LTE—A Air Interface Monitoring Instrumentation" Wide Band Network, Jan. 15, 2015.
Yuarxin et al., "Function of PDCP Sublayer in LTE System", Modern Electronics Technique, vol. 34, No. 7, Apr. 1, 2011.
Gu Xiangyang, "Research and design on LTE UE user plane data transmission", Electronic Test, No. 9, Sep. 2010.
CN Office Action in Application No. 201710314137.8 dated May 15, 2019.
CN Office Action in Application No. 201710314137.8 dated Aug. 9, 2019.
CN Search Report in Application No. 2017.10314137.8 dated Apr. 15, 2019.
"Considerations on ROHC Target mode changes", 3GPP TSG-RAN WG2 #45bis, Jan. 10, 2005.
"PDCP split bearer reordering algorithm" 3GPP TSG-RAN WG2 #87bis, Oct. 6, 2014.
International Search Report and Written Opinion in Application No. PCT/CN2018/085356 dated Nov. 14, 2019.

* cited by examiner

METHOD AND APPARATUS OF DATA PROCESSING FOR DELIVERING PACKET DATA CONVERGENCE PROTOCOL (PDCP) PACKET DATA

CROSS-REFERENCE TO RELATED APPLICATION

The present application is a U.S. national phase application of a PCT Application No. PCT/CN2018/085356 filed on May 2, 2018, which claims a priority of the Chinese patent application No. 201710314137.8 filed in China on May 5, 2017, a disclosure of which is incorporated herein by reference in its entirety.

TECHNICAL FIELD

The present disclosure relates to wireless communication technology, and in particular to a method and an apparatus of data processing.

BACKGROUND

With development of 5th-Generation (5G) mobile communication systems, a split bearer is provided in 5G systems. With the so-called split bearer, which may be as shown in FIG. 1, one base station is used as a master node (MN) and another base station is used as a secondary node (SN). A connection between a UE and the SN splits part of data from a same bearer over the MN to the SN for transmission. The packet data convergence protocol (PDCP) entity of the bearer still resides on the MN, and an independent RLC entity is provided on the SN. Such a bearer for which data packets of the PDCP layer are transmitted through the MN and the SN simultaneously is called the split bearer.

Since the radio link control (RLC) layer delivers data packets to the PDCP layer out-of-order, a robust header compression (RoHC) functional entity of the PDCP layer receives unordered data packets, which causes a disorder in header compression context update, thereby leading to a failure of data decompression.

SUMMARY

The present disclosure provides a method and an apparatus of data processing, in order to solve the technical problem that reception of unordered data packets by the RoHC functional entity of a PDCP layer causes a disorder in header compression context update and as a result data decompression fails.

In a first aspect, the present disclosure provides a method of data processing, applied to a PDCP layer, including: reordering a received PDCP data packet according to a serial number of the PDCP data packet; determining whether the serial number of the reordered PDCP data packet is inside or outside a Reordering_Window, delivering the reordered PDCP data packet to an RoHC entity in a serial number order of the reordered PDCP data packet, obtaining a data packet resulting from header decompression performed by the RoHC entity on the PDCP data packet.

In a second aspect, the present disclosure provides an apparatus of data processing, applied to a PDCP layer, including: an ordering module, configured to reorder a received PDCP data packet according to a serial number of the PDCP data packet; a determination module, configured to determine whether the serial number of the reordered PDCP data packet is inside or outside a Reordering_Window; a delivery module, configured to deliver the reordered PDCP data packet to an RoHC entity in a serial number order of the reordered PDCP data packet, and obtain a data packet resulting from header decompression performed by the RoHC entity on the PDCP data packet.

In a third aspect, the present disclosure provides an apparatus of data processing, including: a processor and a storage, where the storage is configured to store a program and the processor is configured to call the program stored in the storage, to implement the steps of the method of data processing in the first aspect.

In a fourth aspect, the present disclosure provides a computer readable storage medium storing therein a computer program, where the computer program is configured to be executed by a processor, to implement the steps of the method of data processing in the first aspect.

With the method and the apparatus of data processing provided by the present disclosure, correct decompression of header-compressed data packets is enabled in the case that the PDCP layer receives data packets delivered out-of-order from a lower layer.

BRIEF DESCRIPTION OF THE DRAWINGS

To describe the technical solutions in the embodiments of the present disclosure or in the related art more clearly, the accompanying drawings required for describing the embodiments or related art are briefly described hereinafter. Apparently, the drawings accompanying the following description show only some embodiments of the present disclosure, and a person of ordinary skill in the art may derive other drawings from these accompanying drawings without creative efforts.

DETAILED DESCRIPTION

Figure 1:
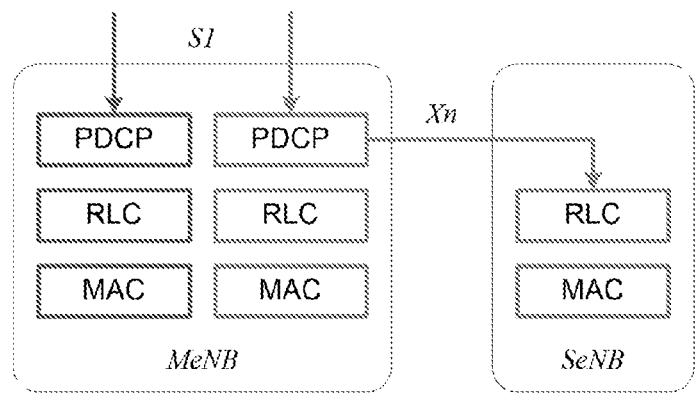
FIG. 1 is a schematic architectural diagram of a split bearer scenario of a method of data processing provided by the present disclosure.

Exemplary embodiments will be described in detail herein, examples of which are illustrated in the accompanying drawings. When the accompanying drawings are referred to in the following description, the same reference numeral denotes same or similar elements throughout different figures unless otherwise specified. The implementations described in the following exemplary embodiments do not represent all implementations consistent with the present disclosure. Rather, they are merely examples of apparatuses and methods consistent with some aspects of the present disclosure as detailed in the appended claims.

The terms "comprise" and "have" and any variations thereof in the specification and claims of the disclosure are intended to cover a non-exclusive inclusion. For example, a process, method, system, product, or device including a series of steps or units is not necessarily limited to those steps or units that are explicitly listed, but may include other steps or units that are not explicitly listed or inherent to such processes, methods, products, or devices.

Figure 2:
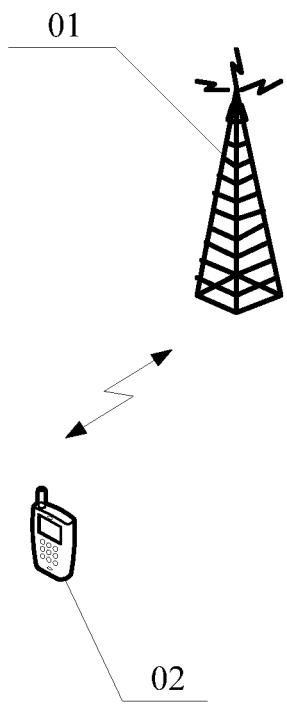
FIG. 2 is a schematic architectural diagram of a system of a method of data processing provided by the present disclosure.

FIG. 2 is a schematic architectural diagram of a system of a method of data processing provided by the present disclosure. As shown in FIG. 2, the system includes network-side equipment 01 and a terminal 02.

Specifically, the network-side equipment 01 may be a base transceiver station (BTS) in a global system of mobile communication (GSM) or a code division multiple access (CDMA) system, or a NodeB (NB) in a wideband code division multiple access (WCDMA) system, or an evolutional Node B (eNB or eNodeB) in an LTE system, or a relay station or access point, or a base station in a future 5G network, or a master node or a secondary node when a split bearer is enabled or the like, and is not limited herein.

The terminal 02 may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

In a future 5th Generation (5G) mobile communication system, in order to support various services, such as enhance mobile broadband (eMBB), ultra-reliable low latency communication (URLLC) service, or the like, and to improve network communication efficiency, an RLC layer is allowed to deliver data packets to a PDCP layer out-of-order. The PDCP layer includes an RoHC entity configured to perform header decompression on the received data packets. This entity has to perform decompression on data packets in sequential order to ensure accuracy of header compression contexts. However, the PDCP layer may receive data packets transmitted from the RLC out-of-order, or the PDCP layer may receive unordered data packets due to the fact that the split bearer is implemented. In view of this, the present disclosure proposes a method of data processing that enables correct decompression of header-compressed data packets even if the PDCP layer receives data packets delivered out-of-order from a lower layer, thereby allowing for an efficient network transmission in a 5G system.

Figure 3:
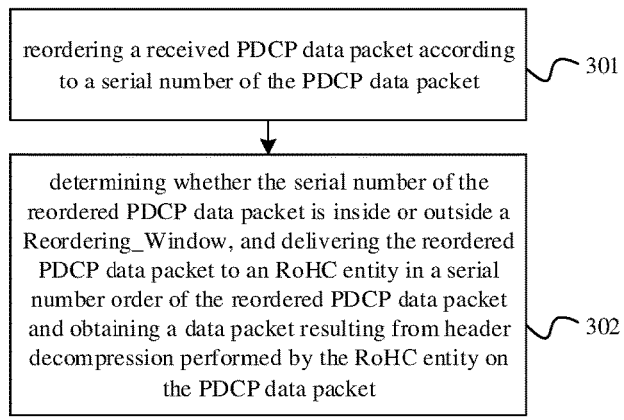
FIG. 3 is a schematic flow diagram of a method of data processing provided by an embodiment of the present disclosure.

FIG. 3 is a schematic flow diagram of a method of data processing provided by an embodiment of the present disclosure. The method is applied to a PDCP layer. This embodiment is applicable to network-side equipment or terminal-side equipment. As shown in FIG. 3, the method includes the following steps.

Step 301: reordering a received PDCP data packet according to a serial number of the PDCP data packet.

In this embodiment, a PDCP receiving end performs data recovery on a received PDCP data packet. This data recovery process includes reordering the received data by the PDCP receiving end. As specified in current communication protocols, the PDCP layer receives a limited range of packets and the limited range is controlled by the size of a Reordering_Window. The size of this Reordering_Window is half of a size of a PDCP serial number space. For the PDCP transmitting end, the data packets transmitted are arranged in order of PDCP serial number. But for the PDCP receiving end, due to various possibilities mentioned in the Background, such as unordered delivery of data packets by the RLC or unordered reception of data packets caused by the split bearer, the data packets received by the PDCP layer may have unordered serial numbers. As far as the Reordering_Window is concerned, the Reordering_Window requires data packets resulting from a reordering performed by the PDCP receiving end on the received data packets, and the data packets are delivered to the RoHC entity according to the sequential order of the data packets in the Reordering_Window, so as to achieve correct header decompression.

Step 302: determining whether the serial number of the reordered PDCP data packet is inside or outside the Reordering_Window, delivering, in the serial number order of the reordered PDCP data packet, the reordered PDCP data packet to the RoHC entity and obtaining a data packet resulting from header decompression performed by the RoHC entity on the PDCP data packet.

In this embodiment, the data packets delivered to the RoHC entity by the PDCP receiving end have to be data packets arranged in order, so as to ensure correct context update of decompression of the received data packets by the RoHC entity. The PDCP reorders the received PDCP data packet and delivers the PDCP data packet to the RoHC entity by using different modes depending on whether the serial number of the PDCP data packet is inside or outside the Reordering_Window, so as to achieve correct header decompression of the data packet by the RoHC entity. The specific delivery mode is not limited in this embodiment.

In the method of data processing provided by this embodiment which is applied to a PDCP layer, the received PDCP data packet is reordered according to a serial number of the PDCP data packet; after it is determined whether the serial number of a reordered PDCP data packet is inside or outside a Reordering_Window, the reordered PDCP data packet is delivered to an RoHC entity in the serial number order of the reordered PDCP data packet, and a data packet resulting from header decompression performed by the RoHC entity on the PDCP data packet is obtained. As such, the solution described above enables correct decompression of the header-compressed data packets even if the PDCP layer receives the data packets delivered out-of-order from a lower layer.

Figure 4:
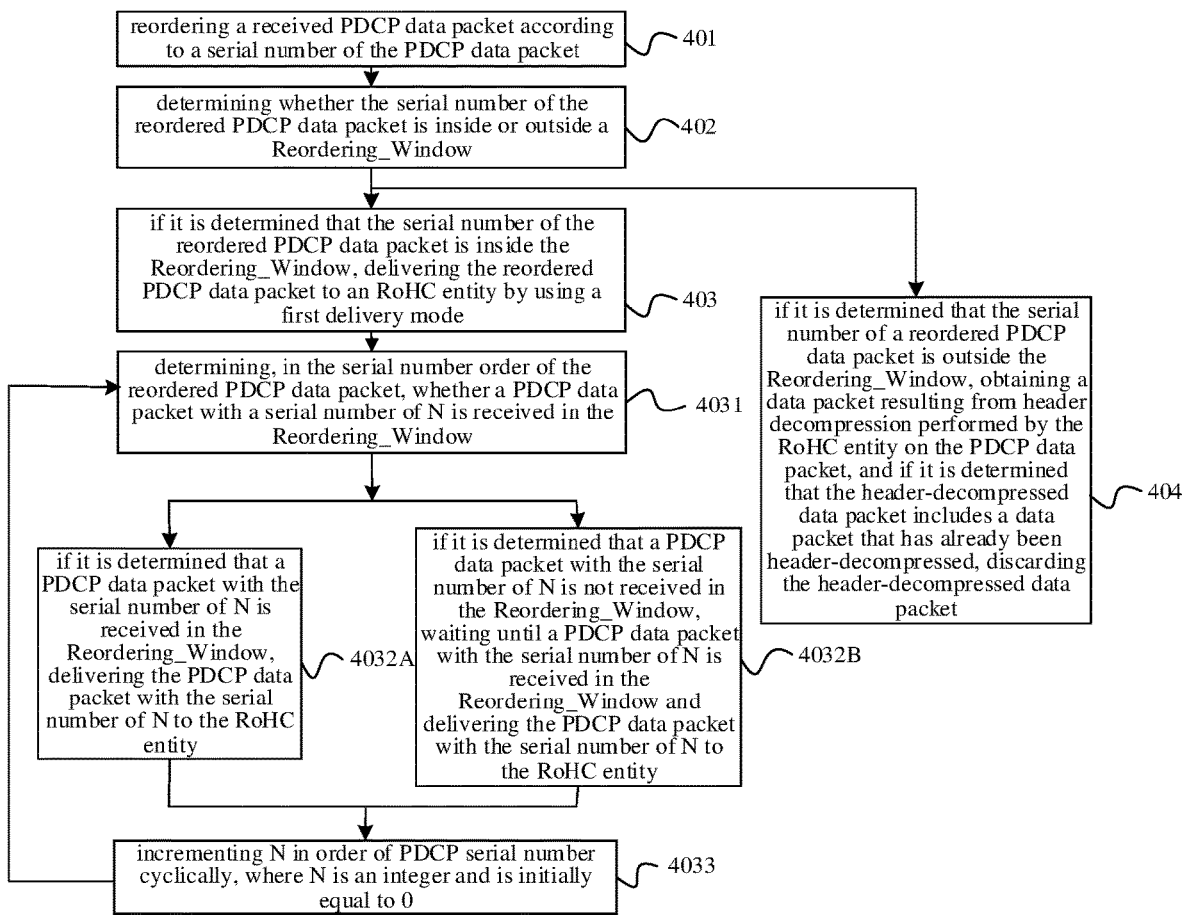
FIG. 4 is a schematic flow diagram of a method of data processing provided by another embodiment of the present disclosure.

FIG. 4 is schematic flow diagram of a method of data processing provided by another embodiment of the present disclosure. As in FIG. 3, this embodiment is applicable to network-side equipment or terminal-side equipment. As shown in FIG. 4, this method includes the following steps.

Step 401: reordering a received PDCP data packet according to a serial number of the PDCP data packet.

Step 402: determining whether the serial number of a reordered PDCP data packet is inside or outside a Reordering_Window.

Step 403: if it is determined that the serial number of the reordered PDCP data packet is inside the Reordering_Window, delivering the reordered PDCP data packet to an RoHC entity by using a first delivery mode. The first delivery mode specifically includes the following steps.

Step 4031: determining, in the serial number order of the reordered PDCP data packet, whether a PDCP data packet with a serial number of N is received in the Reordering_Window.

Step 4032A: if it is determined that a PDCP data packet with the serial number of N is received in the Reordering_Window, delivering the PDCP data packet with the serial number of N to the RoHC entity.

Step 4032B: if it is determined that a PDCP data packet with the serial number of N is not received in the Reordering_Window, waiting until a PDCP data packet with the serial number of N is received in the Reordering_Window and delivering the PDCP data packet with the serial number of N to the RoHC entity.

Step 4033: incrementing N in order of PDCP serial number cyclically and repeating the step 4031 and step 4032A or step 4032B described above, where N is an integer and is initially equal to 0.

Step 404: if it is determined that the serial number of a reordered PDCP data packet is outside the Reordering_Window, obtaining a data packet resulting from header decompression performed by the RoHC entity on the PDCP data packet, and if it is determined that the header-decompressed data packet includes a data packet that has already been header-decompressed, discarding the header-decompressed data packet.

In step 403 and step 4031, step 4032A, and step 4032B included in the step 403, if the serial number of a received and reordered PDCP data packet is inside the Reordering_Window, the PDCP data packet is delivered in order of PDCP serial number to the RoHC entity for header decompression. In step 404, if the serial number of a received and reordered PDCP data packet is outside the Reordering_Window, this PDCP data packet is delivered to the RoHC entity for header decompression and then the decompressed data packet is discarded. As such, there is no sequential relation between step 403 and step 4031, step 4032A and step 4032B included in the step 403 and step 404, and the sequence of performance of step 403 and step 4031, step 4032A, and step 4032B included in the step 403 and step 404 shall be determined according to whether the serial number of a PDCP data packet is inside or outside the Reordering_Window.

Figure 5:
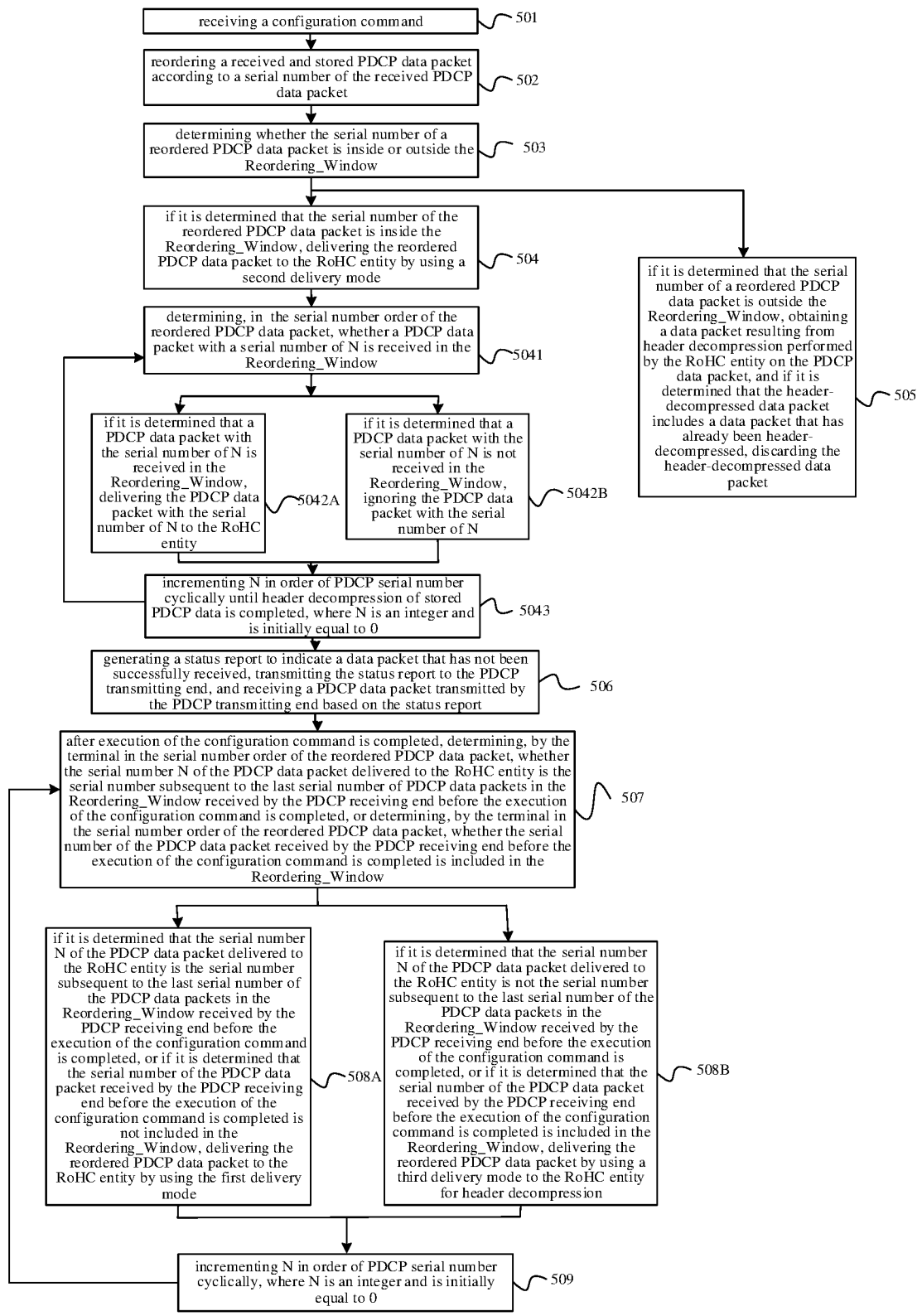
FIG. 5 is a schematic flow diagram of a method of data processing provided by another embodiment of the present disclosure.

FIG. 5 is a schematic flow diagram of a method of data processing provided by another embodiment of the present disclosure. Unlike the embodiments in FIGS. 3 and 4, this embodiment is applied to terminal-side equipment. As shown in FIG. 5, this method includes the following steps.

Step 501: receiving a configuration command.

Specifically, the configuration command is a configuration message transmitted to the terminal by the network-side equipment. The configuration message may include a handover command to instruct the terminal to perform a handover between base stations. The configuration message may further include a bearer mode change command to indicate to the terminal a SN change or bearer type change (e.g., a split bearer is changed to another type of bearer, or another type of bearer is changed to a split bearer). The following embodiment is illustrated by taking header compression in a split bearer scenario during handover as an example.

Step 502: reordering a received and stored PDCP data packet according to a serial number of the received PDCP data packet.

PDCP data packets that have been stored by the PDCP receiving end may be header-decompressed by using RoHC configurations specified in the configuration message transmitted to the terminal by the network side prior to handover. Upon completion of processing on the stored data, the RoHC entity may decompress a subsequently received PDCP data packet by using a compression mode indicated in the RoHC configuration specified in the "handover command" of the configuration command. The stored PDCP data packets include the PDCP data packet being processed in the Reordering_Window before the PDCP receiving end receives the configuration command.

Step 503: determining whether the serial number of a reordered PDCP data packet is inside or outside the Reordering_Window.

Step 504: if it is determined that the serial number of the reordered PDCP data packet is inside the Reordering_Window, delivering the reordered PDCP data packet to the RoHC entity by using a second delivery mode. The second delivery mode may include specifically the following steps.

Step 5041: determining, in the serial number order of the reordered PDCP data packet, whether a PDCP data packet with a serial number of N is received in the Reordering_Window.

Step 5042A: if it is determined that a PDCP data packet with the serial number of N is received in the Reordering_Window, delivering the PDCP data packet with the serial number of N to the RoHC entity.

Step 5042B: if it is determined that a PDCP data packet with the serial number of N is not received in the Reordering_Window, ignoring the PDCP data packet with the serial number of N.

Step 5043: incrementing N in order of PDCP serial number cyclically and repeating step 5041 and step 5042A or step 5042B described above until header decompression of stored PDCP data is completed, where N is an integer and is initially equal to 0.

Step 505: if it is determined that the serial number of a reordered PDCP data packet is outside the Reordering_Window, obtaining a data packet resulting from header decompression performed by the RoHC entity on the PDCP data packet, and if it is determined that the header-decompressed data packet includes a data packet that has already been header-decompressed, discarding the header-decompressed data packet.

Step 506: generating a status report to indicate a data packet that has not been successfully received, transmitting the status report to the PDCP transmitting end, and receiving a PDCP data packet transmitted by the PDCP transmitting end based on the status report.

The PDCP transmitting end, upon receiving the status report transmitted from the PDCP receiving end, retransmits the PDCP data packet that has not been successfully received based on the indication information in the status report.

Step 507: after execution of the configuration command is completed, determining, by the terminal in the serial number order of the reordered PDCP data packet, whether the serial number N of the PDCP data packet delivered to the RoHC entity is the serial number subsequent to the last serial number of PDCP data packets in the Reordering_Window received by the PDCP receiving end before the execution of the configuration command is completed, or determining, by the terminal in the serial number order of the reordered PDCP data packet, whether the serial number of the PDCP data packet received by the PDCP receiving end before the execution of the configuration command is completed is included in the Reordering_Window.

Step 508A: if it is determined that the serial number N of the PDCP data packet delivered to the RoHC entity is the serial number subsequent to the last serial number of the PDCP data packets in the Reordering_Window received by the PDCP receiving end before the execution of the configuration command is completed, or if it is determined that the serial number of the PDCP data packet received by the PDCP receiving end before the execution of the configuration command is completed is not included in the Reordering_Window, delivering the reordered PDCP data packet to the RoHC entity by using the first delivery mode.

In this step, for both the case where the serial number N of the PDCP data packet delivered to the RoHC entity is the serial number subsequent to the last serial number of the PDCP data packets in the Reordering_Window received by the PDCP receiving end before the execution of the configuration command is completed and the case where the serial number of the PDCP data packet received by the PDCP receiving end before the execution of the configuration command is completed is not included in the Reordering_Window, the reordered PDCP data packet may be delivered to the RoHC entity by using the first delivery mode described in the above embodiment (shown in FIG. 4) for header decompression. For example, assuming that the maximum serial number of the PDCP data packets received prior to terminal handover is 5, if the serial number of the PDCP data packet delivered to the RoHC entity exceeds 5 (6 or 7, for example), or if the lower bound of the Reordering_Window is 5 or 6 or 7, the PDCP receiving end starts to deliver the reordered PDCP data packet by using the first delivery mode to the RoHC entity for header decompression.

Step 508B: if it is determined that the serial number N of the PDCP data packet delivered to the RoHC entity is not the serial number subsequent to the last serial number of the PDCP data packets in the Reordering_Window received by the PDCP receiving end before the execution of the configuration command is completed, or if it is determined that the serial number of the PDCP data packet received by the PDCP receiving end before the execution of the configuration command is completed is included in the Reordering_Window, delivering the reordered PDCP data packet by using a third delivery mode to the RoHC entity for header decompression.

In this step, the reordered PDCP data packet is delivered to the RoHC entity by using the third delivery mode, which specifically including the following possible operation modes.

First mode: if it is determined that a PDCP data packet with the serial number of N is received in the Reordering_Window and it is determined that the PDCP data packet with the serial number of N has been delivered to the RoHC entity, ignoring the PDCP data packet with the serial number of N; or if it is determined that a PDCP data packet with the serial number of N is received in the Reordering_Window and it is determined that the PDCP data packet with the serial number of N has not been delivered to the RoHC entity, delivering the PDCP data packet with the serial number of N to the RoHC entity for header decompression.

Optionally, if it is determined that a PDCP data packet with the serial number of N is received in the Reordering_Window and it is determined that the PDCP data packet with the serial number of N has been delivered to the RoHC entity, delivering the ignored PDCP data packet with the serial number of N to the RoHC entity and obtaining a data packet resulting from header-decompression performed by the RoHC entity on the ignored PDCP data packet with the serial number of N; if it is determined that the header-decompressed data packet includes a data packet that has already been header-decompressed, discarding the header-decompressed data packet.

Second mode: if it is determined that a PDCP data packet with the serial number of N is not received in the Reordering_Window and it is determined that the PDCP data packet with the serial number of N has not been delivered to the RoHC entity, waiting until the PDCP data packet with the serial number of N is received in the Reordering_Window and delivering the data packet with the serial number of N to the RoHC entity for decompression.

Step 509: incrementing N in order of PDCP serial number cyclically and repeating step 507 and step 508A or step 508B described above, where N is an integer and is initially equal to 0.

In step 504 to step 509, if it is determined that the serial number of a received and reordered PDCP data packet is inside the Reordering_Window, the PDCP data packet is delivered to the RoHC entity in order of PDCP serial number for header decompression. In step 505, if it is determined that the serial number of a received and reordered PDCP data packet is outside the Reordering_Window, this PDCP data packet is delivered to the RoHC entity for header decompression, and then the header-decompressed data packet is discarded. As such, there is no sequential relation between step 504 to step 509 and step 505, and the sequence of performance of step 504 to step 509 and step 505 shall be determined according to whether the serial number of a PDCP data packet is inside or outside the Reordering_Window.

Figure 6:
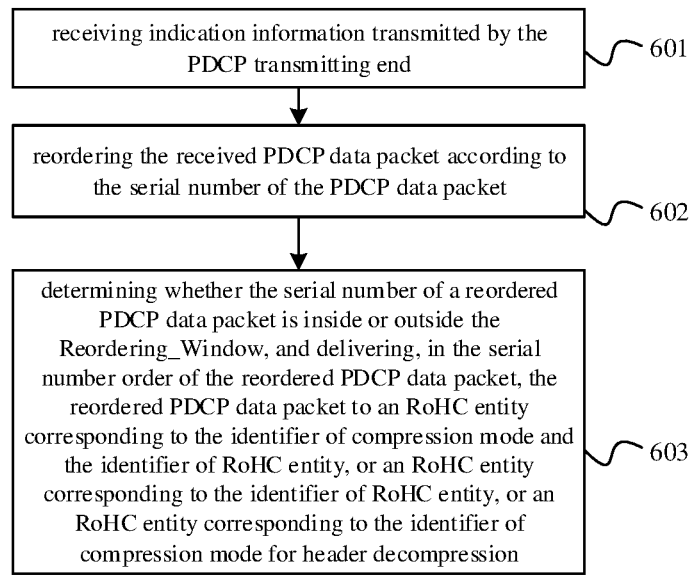
FIG. 6 is a schematic flow diagram of a method of data processing provided by another embodiment of the present disclosure.

FIG. 6 is a schematic flow diagram of a method of data processing provided by another embodiment of the present disclosure. As in FIGS. 3 and 4, this embodiment is applicable to network-side equipment or terminal-side equipment. As shown in FIG. 6, this method includes the following steps.

Step 601: receiving indication information transmitted by the PDCP transmitting end.

Specifically, the indication information may include an identifier of compression mode and an identifier of RoHC entity, or include an identifier of RoHC entity, or include an identifier of compression mode.

Step 602: reordering the received PDCP data packet according to the serial number of the PDCP data packet.

Step 603: determining whether the serial number of a reordered PDCP data packet is inside or outside the Reordering_Window, and delivering, in the serial number order of the reordered PDCP data packet, the reordered PDCP data packet to an RoHC entity corresponding to the identifier of compression mode and the identifier of RoHC entity, or an RoHC entity corresponding to the identifier of RoHC entity, or an RoHC entity corresponding to the identifier of compression mode for header decompression.

In this step, according to network configuration, PDCP entity has multiple RoHC entities each using a different compression mode. When transmitting a header-compressed data packet, the PDCP transmitting end indicates the compression mode used for the data packet. The indication information includes an identifier of compression mode and/or an identifier of RoHC entity. Upon receiving the indication information, the PDCP receiving end may deliver sequentially the PDCP data packet reordered in order of PDCP serial number to an RoHC entity corresponding to the compression mode, or deliver the PDCP data packets to an RoHC entity corresponding to the compression mode, or directly deliver the PDCP data packet to an RoHC entity specified by the identifier of RoHC entity.

Figure 7:
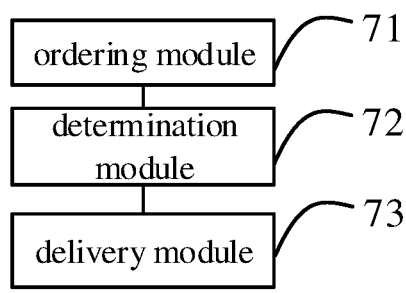
FIG. 7 is a schematic structural diagram of an apparatus of data processing provided by an embodiment of the present disclosure.

FIG. 7 is a schematic structural diagram of an apparatus of data processing provided by an embodiment of the present disclosure. As shown in FIG. 7, the apparatus of data processing is applied to a PDCP layer and includes: an ordering module 71 configured to reorder a received PDCP data packet according to a serial number of the PDCP data packet; a determination module 72 configured to determine whether the serial number of the reordered PDCP data packet is inside or outside a Reordering_Window; a delivery module 73 configured to deliver, in the serial number order of the reordered PDCP data packet, the reordered PDCP data packet to an RoHC entity, and obtain a data packet resulting from header decompression performed by the RoHC entity on the PDCP data packet.

The apparatus of data processing is applicable to network-side equipment and/or terminal-side equipment.

The apparatus of data processing in this embodiment may be configured to implement the method embodiment as shown in FIG. 3 and has similar implementation principle and technical effects, and therefore will not be described again herein.

The apparatus of data processing provided by this embodiment is applied to a PDCP layer and is configured to: reorder a received PDCP data packet according to a serial number of the PDCP data packet; determine whether the serial number of the reordered PDCP data packet is inside or outside a Reordering_Window; and deliver, in the serial number order of the reordered PDCP data packet, the reordered PDCP data packet to an RoHC entity, and obtain a data packet resulting from header decompression performed by the RoHC entity on the PDCP data packet. As such, the solution described above enables correct decompression of header-compressed data packets even if the PDCP layer receives data packets delivered out-of-order from a lower layer.

Figure 8:
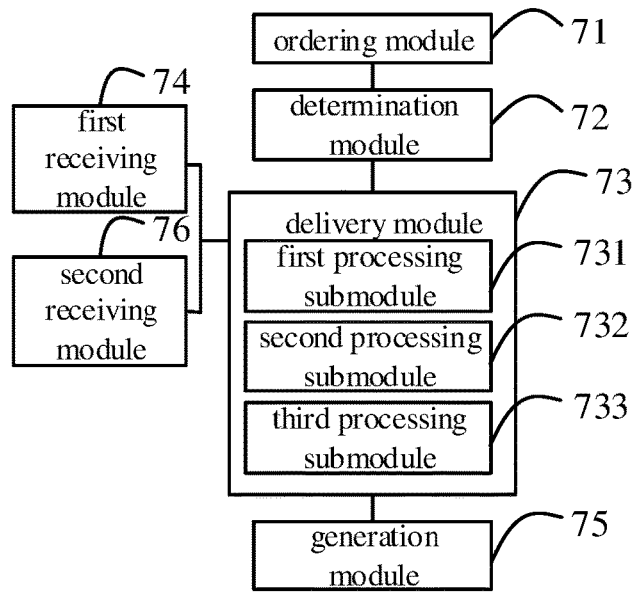
FIG. 8 is a schematic structural diagram of an apparatus of data processing provided by another embodiment of the present disclosure.

FIG. 8 is a schematic structural diagram of an apparatus of data processing provided by another embodiment of the present disclosure. As shown in FIG. 8, on the basis of the above embodiment, the delivery module 73 includes a first processing submodule 731 configured to deliver the reordered PDCP data packets to the RoHC entity by using a first delivery mode. The first delivery mode includes: determining, in the serial number order of the reordered PDCP data packet, whether a PDCP data packet with a serial number of N is received in the Reordering_Window; if it is determined that a PDCP data packet with the serial number of N is received in the Reordering_Window, delivering the PDCP data packet with the serial number of N to the RoHC entity; or if it is determined that a PDCP data packet with the serial number of N is not received in the Reordering_Window, waiting until a PDCP data packet with the serial number of N is received in the Reordering_Window and delivering the PDCP data packet with the serial number of N to the RoHC entity; incrementing N in order of PDCP serial number cyclically, and repeating processing on the PDCP data packet with a incremented serial number of N by the first processing submodule 731, where N is an integer and is initially equal to 0.

Optionally, the apparatus of data processing is applied to the terminal side and accordingly further includes: a first receiving module 74 configured to receive a configuration command; and, accordingly, an ordering module 71 specifically configured to reorder a received and stored PDCP data packet.

Optionally, the delivery module 73 includes a second processing submodule 732 configured to, when a configuration command is received by the first receiving module 74, deliver the reordered PDCP data packet to the RoHC entity by using a second delivery mode. The second delivery mode includes: determining, in the serial number order of the reordered PDCP data packet, whether a PDCP data packet with a serial number of N is received in the Reordering_Window; if it is determined that a PDCP data packet with the serial number of N is received in the Reordering_Window, delivering the PDCP data packet with the serial number of N to the RoHC entity for header decompression; or if it is determined that a PDCP data packet with the serial number of N is not received in the Reordering_Window, ignoring the PDCP data packet with the serial number of N; incrementing N in order of PDCP serial number cyclically, and repeating processing on the PDCP data packet with a incremented serial number of N by the second processing submodule 732 until header decompression of stored PDCP data is completed, where N is an integer and is initially equal to 0.

Optionally, the apparatus further includes a generation module 75 configured to generate a status report to indicate a data packet that has not been successfully received. The generation module 75 is applicable to network-side equipment and/or terminal-side equipment.

Optionally, the first receiving module 74 is further configured to receive a PDCP data packet transmitted by the PDCP transmitting end based on the status report.

Optionally, the delivery module 73 includes a third processing submodule 733 configured to: after the execution of the configuration command is completed, determine, in the serial number order of the reordered PDCP data packet, whether the serial number N of the PDCP data packet delivered to the RoHC entity is the serial number subsequent to the last serial number of PDCP data packets in the Reordering_Window received by the PDCP receiving end before the execution of the configuration command is completed, or determine, in the serial number order of the reordered PDCP data packet, whether the serial number of the PDCP data packet received by the PDCP receiving end before the execution of the configuration command is completed is included in the Reordering_Window; if it is determined that the serial number N of the PDCP data packet delivered to the RoHC entity is the serial number subsequent to the last serial number of the PDCP data packets in the Reordering_Window received by the PDCP receiving end before the execution of the configuration command is completed, or if it is determined that the serial number of the PDCP data packet received by the PDCP receiving end before the execution of the configuration command is completed is not included in the Reordering_Window, deliver the reordered PDCP data packet to the RoHC entity by using the first delivery mode; if it is determined that the serial number N of the PDCP data packet delivered to the RoHC entity is not the serial number subsequent to the last serial number of the PDCP data packets in the Reordering_Window received by the PDCP receiving end before the execution of the configuration command is completed, or if it is determined that the serial number of the PDCP data packet received by the PDCP receiving end before the execution of the configuration command is completed is included in the Reordering_Window, deliver the reordered PDCP data packet to the RoHC entity by using a third delivery mode; increment N in order of PDCP serial number cyclically, and repeat processing on the PDCP data packet with a incremented serial number of N by the third processing submodule 733, where N is an integer and is initially equal to 0.

Optionally, the third processing submodule 733 is specifically configured to: determine whether a PDCP data packet with the serial number of N is received in the Reordering_Window; if it is determined that a PDCP data packet with the serial number of N is received in the Reordering_Window and it is determined that the PDCP data packet with the serial number of N has been delivered to the RoHC entity, ignore the PDCP data packet with the serial number of N; or if it is determined that a PDCP data packet with the serial number of N is received in the Reordering_Window and it is determined that the PDCP data packet with the serial number of N has not been delivered to the RoHC entity, deliver the PDCP data packet with the serial number of N to the RoHC entity for header decompression; or if it is determined that a PDCP data packet with the serial number of N is not received in the Reordering_Window and it is determined that the PDCP data packet with the serial number of N has not been delivered to the RoHC entity, wait until the PDCP data packet with the serial number of N is received in the Reordering_Window and deliver the PDCP data packet with the serial number of N to the RoHC entity; increment N in order of PDCP serial number cyclically, and repeat processing on the PDCP data packet with a incremented serial number of N by the third processing submodule 733, where N is an integer and is initially equal to 0.

Optionally, the third processing submodule 733 is further configured to deliver the ignored PDCP data packet with the serial number of N to the RoHC entity, and obtain a data packet resulting from header decompression performed by the RoHC entity on the PDCP data packet. Accordingly, the determination module 72 is further configured to discard the header-decompressed data packet if it is determined that the header-decompressed data packet includes a data packet that has already been header-decompressed.

Optionally, the determination module 72 is further configured to, after a data packet resulting from header decompression performed by the RoHC entity on the PDCP data packet is obtained by the delivery module in the case that it is determined that the serial number of reordered PDCP data packet is outside the Reordering_Window, discard the header-decompressed data packet if it is determined that the decompressed data packet includes a data packet that has already been header-decompressed.

Optionally, the apparatus further includes a second receiving module 76 configured to receive indication information transmitted by the PDCP transmitting end. The indication information includes an identifier of compression mode and an identifier of RoHC entity; or includes an identifier of RoHC entity; or includes an identifier of compression mode.

Accordingly, the delivery module 73 is specifically configured to deliver the reordered PDCP data packet to an RoHC entity corresponding to the identifier of compression mode and the identifier of RoHC entity; or an RoHC entity corresponding to the identifier of RoHC entity; or an RoHC entity corresponding to the identifier of compression mode.

In summary, in this embodiment, the apparatus of data processing reorders at the PDCP layer received data packets delivered out-of-order by a lower layer, and delivers the reordered data packets to the RoHC in different modes, thereby enabling accurate transmission of the PDCP data packets to the RoHC entity and further enabling correct header decompression of the data packets by the RoHC entity.

The apparatus of data processing in this embodiment may be configured to perform the method embodiments as shown in FIG. 4 to FIG. 6 and has similar implementation principle and technical effects, and therefore will not be described again herein.

Figure 9:
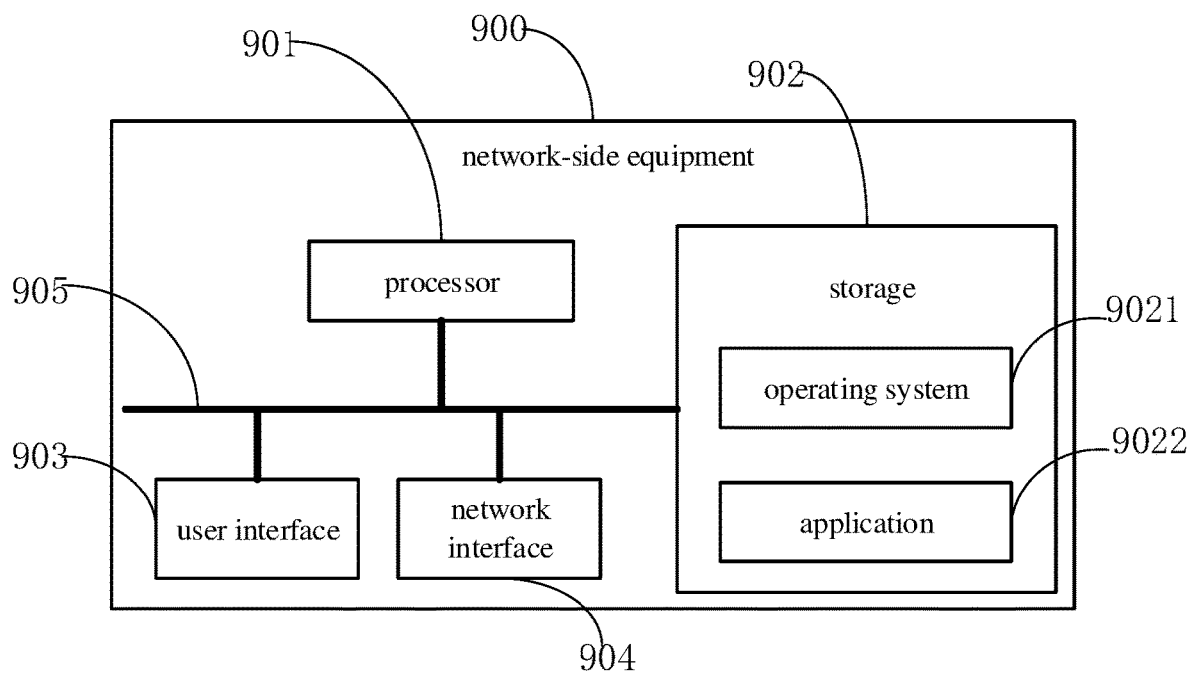
FIG. 9 is a schematic structural diagram of network-side equipment provided by an embodiment of the present disclosure.

FIG. 9 is a schematic structural diagram of network-side equipment provided by an embodiment of the present disclosure. The network-side equipment 900 shown in FIG. 9 includes: at least one processor 901, a storage 902, and at least one network interface 904 and a user interface 903. Various components in the network-side equipment 900 are coupled together via a bus system 905. It is appreciated that the bus system 905 is configured to enable connective communication between these components. In addition to a data bus, the bus system 905 also includes a power bus, a control bus, and a status signal bus. However, for the sake of clarity, all the buses are denoted collectively as the bus system 905 in FIG. 9.

The user interface 903 may include a display, a keyboard or a click device (e.g., a mouse), a trackball, a touch pad, or a touch screen and the like.

It is appreciated that the storage 902 in embodiments of the present disclosure may be a volatile storage or a non-volatile storage, or may include both a volatile storage and a non-volatile storage. The non-volatile storage may be a read-only memory (ROM), a programmable ROM (PROM), an erasable PROM (EPROM), or an electrically EPROM (EEPROM) or flash memory. The volatile storage may be a random access memory (RAM) that acts as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The storage 902 in the system and method described in the embodiments of the present disclosure is intended to include, without being limited to, these and any other suitable type of storage.

In some implementations, the storage 902 stores the following elements, executable modules or data structures, or a subset or an extended set thereof: an operating system 9021 and an application 9022.

The operating system 9021 includes various system programs, such as a framework layer, a core library layer, or a driver layer and the like, so as to implement various basic services and handle hardware-based tasks. The application 9022 includes various applications, such as a media player, a browser, and the like, so as to implement various application services. Programs for implementing the method of the embodiments of the present disclosure may be included in the application 9022.

In embodiments of the present disclosure, by calling programs or instructions stored in the storage 902, specifically programs or instructions stored in the application 9022, the processor 901 is configured to process data packets at the PDCP layer in the following steps: reordering a received PDCP data packet according to a serial number of the PDCP data packet; determining whether the serial number of a reordered PDCP data packet is inside or outside a Reordering_Window; delivering, in the serial number order of the reordered PDCP data packet, the reordered PDCP data packet to an RoHC entity, and obtaining a data packet resulting from header decompression performed by the RoHC entity on the PDCP data packet.

The method disclosed in the above embodiments of the present disclosure may be applied to or implemented by the processor 901. The processor 901 may be an integrated circuit chip with signal processing capabilities. During implementation, various steps of the method may be implemented in form of hardware by an integrated logic circuit or in form of software by instructions in the processor 901. The processor 901 may be a general-purpose processor, a digital signal processor (DSP), an application specific integrated circuit (ASIC), a field programmable gate array (FPGA) or other programmable logic devices, discrete gates or transistor logic devices, or discrete hardware components, which may implement or perform the methods, steps and logical block diagrams disclosed in embodiments of the present disclosure. The general-purpose processor may be a microprocessor or the processor may be any conventional processor or the like. The steps of the method disclosed in connection with the embodiments of the present disclosure may be directly implemented in hardware by a coding processor, or implemented by a combination of hardware and software modules in the coding processor. The software module may reside in a storage medium well-known in the art such as a random access memory, flash memory, read-only memory, programmable read-only memory or electrically erasable programmable memory, register, and the like. The storage medium resides in the storage 902, and the processor 901 reads information in the storage 902 and executes the steps of the method described above in combination with its hardware.

It is appreciated that the embodiments described in the present disclosure may be implemented in hardware, software, firmware, middleware, microcode, or a combination thereof. For hardware implementation, the processing unit may be implemented in one or more application specific integrated circuits (ASIC), a digital signal processor (DSP), a DSP device (DSPD), a programmable logic device (PLD), a field-programmable gate array (FPGA), a general-purpose processor, a controller, a microcontroller, a microprocessor, other electronic units for performing the functions described in the present disclosure, or a combination thereof.

For software implementation, the techniques described in the embodiments of the present disclosure can be implemented by modules (e.g., processes, functions, etc.) that perform the functions described in the embodiments of the present disclosure. Software codes may be stored in a storage and executed by a processor. The storage may be implemented internal or external to the processor.

Optionally, the processor 901 may be configured to: if it is determined that the serial number of a reordered PDCP data packet is inside the Reordering_Window, delivering the reordered PDCP data packet to an RoHC entity by using a first delivery mode. The first delivery mode includes: determining, in the serial number order of the reordered PDCP data packet, whether a PDCP data packet with the serial number of N is received in the Reordering_Window; if it is determined that a PDCP data packet with the serial number of N is received in the Reordering_Window, delivering the PDCP data packet with the serial number of N to the RoHC entity; or if it is determined that a PDCP data packet with the serial number of N is not received in the Reordering_Window, waiting until a PDCP data packet with the serial number of N is received in the Reordering_Window and delivering the PDCP data packet with the serial number of N to the RoHC entity; and incrementing N in order of PDCP serial number cyclically, and repeating the steps described above, where N is an integer and is initially equal to 0.

Optionally, the processor 901 is further configured to, after delivering the reordered PDCP data packet to the RoHC entity in the serial number order of the reordered PDCP data packet, generate a status report to indicate a data packet that has not been successfully received, and transmit the status report to the PDCP transmitting end.

Optionally, the processor 901 is further configured to, after transmitting the status report to the PDCP transmitting end, receive a PDCP data packet transmitted by the PDCP transmitting end based on the status report.

Optionally, the processor 901 is further configured to: after a data packet resulting from header decompression performed by the RoHC entity on the PDCP data packet is obtained if it is determined that the serial number of reordered PDCP data packet is outside the Reordering_Window, discard the header-decompressed data packet if it is determined that the header-decompressed data packet includes a data packet that has already been header-decompressed.

Optionally, the processor 901 is further configured to receive indication information transmitted by the PDCP transmitting end. The indication information includes an identifier of compression mode and an identifier of RoHC entity; or includes an identifier of RoHC entity; or includes an identifier of compression mode. Accordingly, the delivering the reordered PDCP data packet to the RoHC entity includes delivering the reordered PDCP data packet to an RoHC entity corresponding to the identifier of compression mode and the identifier of RoHC entity; or an RoHC entity corresponding to the identifier of RoHC entity; or an RoHC entity corresponding to the identifier of compression mode.

The network-side equipment 900 may implement various processes implemented by the network-side equipment in the above embodiment, and therefore will not be described again to avoid repetition. The network-side equipment reorders at the PDCP layer data packets delivered out-of-order by a lower layer, and delivers the reordered data packets to the RoHC in different modes, thereby enabling accurate transmission of the PDCP data packets to the RoHC entity and further enabling correct header decompression of the data packets by the RoHC entity.

Figure 10:
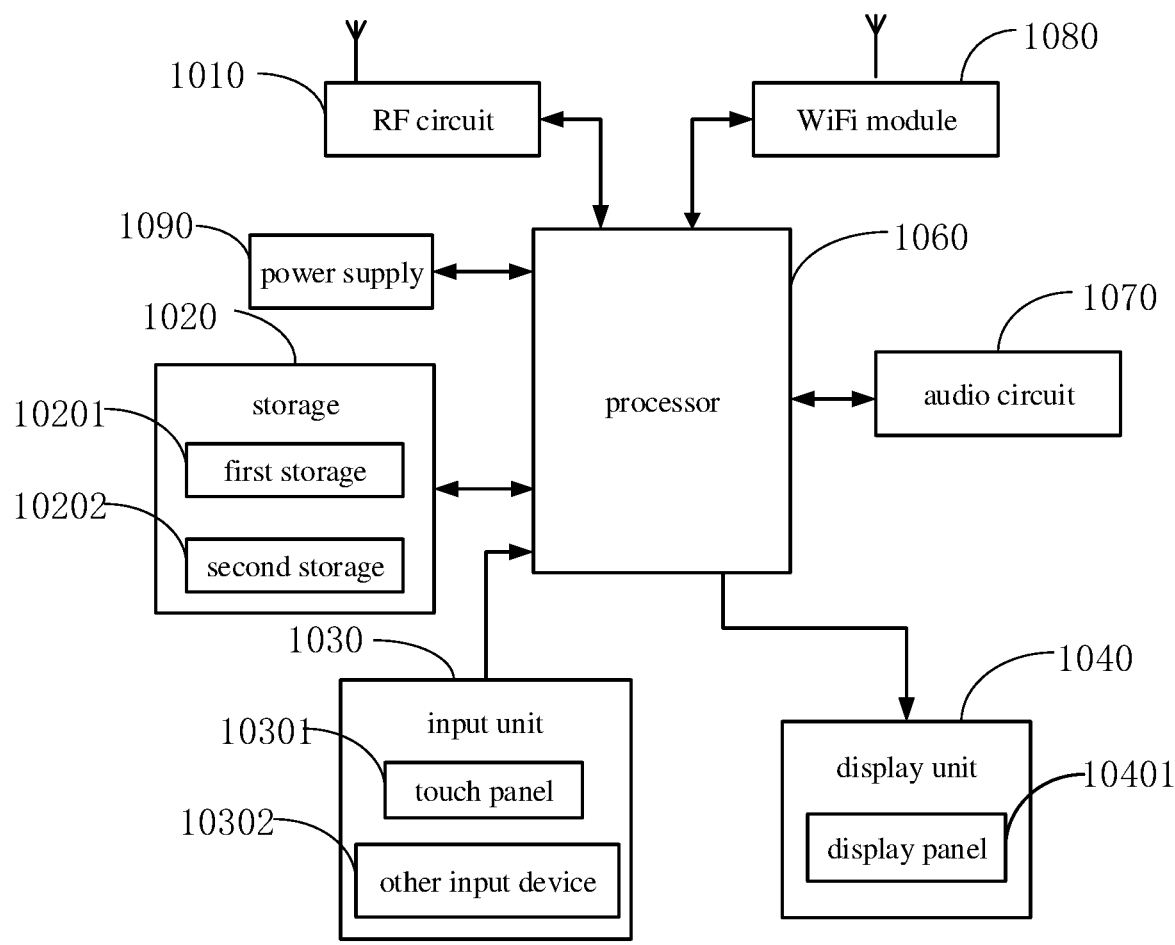
FIG. 10 is a schematic structural diagram of a mobile terminal provided by an embodiment of the present disclosure.

FIG. 10 is a schematic structural diagram of a mobile terminal provided by an embodiment of the present disclosure. Specifically, the mobile terminal 1000 in FIG. 10 may be a cellphone, a tablet, a personal digital assistant (PDA), or a vehicle-mounted computer, and the like.

The mobile terminal 1000 in FIG. 10 includes a radio frequency (RF) circuit 1010, a storage 1020, an input unit 1030, a display unit 1040, a processor 1060, an audio circuit 1070, a wireless fidelity (WiFi) module 1080, and a power supply 1090.

The input unit 1030 may be configured to receive numerical or character information input by a user and generate a signal input related to user settings and function controls of the mobile terminal 1000. Specifically, in an embodiment of the present disclosure, the input unit 1030 may include a touch panel 1031. The touch panel 1031, aka touch screen, may sense user's touch actions on or in proximity to the touch panel (e.g., a user performs touch actions on the touch panel 1031 with any suitable object or accessory such as finger and stylus), and drive a corresponding connected device according to preset programs. Optionally, the touch panel 1031 may include a touch sensing device and a touch controller. The touch sensing device senses the location of user's touch, detects signal caused by the touch and transfers the signal to the touch controller; the touch controller receives touch information from the touch sensing device, converts the information into touch point coordinates and transfers the coordinates to the processor 1060, and the touch controller may receive commands from the processor 1060 and execute the commands. Further, the touch panel 1031 may be implemented with technologies such as resistive, capacitive, infrared (IR) and surface acoustic wave (SAW). In addition to the touch panel 1031, the input unit 1030 may include other input device 1032, which may include, but not limited to one or more of physical keyboard, function key (e.g., volume control button, switch button and the like), track ball, mouse, joystick, etc.

The display unit 1040 may be configured to display information input by the user or information provided to the user as well as various menu interfaces of the mobile terminal 1000. The display unit 1040 may include a display panel 1041. Optionally, the display panel 1041 may be configured in form of an LCD or an organic light-emitting diode (OLED) display and the like.

It is to be noted that the touch panel 1031 may cover the display panel 1041 to form a touch display screen. Upon detection of a touch operation on or in proximity to the touch display screen, the touch display screen transfers the detected touch signal to the processor 1060 to determine the type of the touch event. Then the processor 1060 provides a corresponding visual output on the touch display screen based on the type of the touch event.

The touch display screen includes a display region for application interfaces and a display region for common controls. The arrangement of the display region for application interfaces and the display region for common controls is not limited and may be a vertical arrangement, a horizontal arrangement, or another arrangement that can distinguish between the two display regions. The display region for application interfaces may be configured to display interfaces of applications. Each interface may include at least one interface element, such as an application icon and/or a desktop widget. The display region for application interfaces may alternatively be an empty interface void of any content. The display region for common controls is configured to display frequently used controls, e.g., setting buttons, interface serial numbers, scroll bars, application icons such as a phone book icon, etc.

The processor 1060 is the control center of the mobile terminal 1000 and is connected to various parts of the cell phone via a variety of interfaces and lines. The processor 1060 performs various functions of UE 1000 and processes data by running or executing software programs and/or modules stored in a first storage 10201 and calling data stored in a second storage 10202, so as to monitor and control the general operation of UE 1000. Optionally, the processor 1060 may include one or more processing units.

In an embodiment of the present disclosure, by calling software programs and/or modules stored in the first storage 10201 and/or data stored in the second storage 10202, the processor 1060 is configured to process data packets at the PDCP layer in the following steps: reordering a received PDCP data packet according to a serial number of the PDCP data packet; determining whether the serial number of a reordered PDCP data packet is inside or outside a Reordering_Window; delivering the reordered PDCP data packet to an RoHC entity in the serial number order of the reordered PDCP data packet, and obtaining a data packet resulting from header decompression performed by the RoHC entity on the PDCP data packet.

Optionally, the processor 1060 may be configured to: if it is determined that the serial number of a reordered PDCP data packet is inside the Reordering_Window, delivering the reordered PDCP data packet to a robust header compression (RoHC) entity by using a first delivery mode. The first delivery mode includes: determining, in the serial number order of the reordered PDCP data packet, whether a PDCP data packet with the serial number of N is received in the Reordering_Window; if it is determined that a PDCP data packet with the serial number of N is received in the Reordering_Window, delivering the PDCP data packet with the serial number of N to the RoHC entity; or if it is determined that a PDCP data packet with the serial number of N is not received in the Reordering_Window, waiting until a PDCP data packet with the serial number of N is received in the Reordering_Window and delivering the PDCP data packet with the serial number of N to the RoHC entity; incrementing N in order of PDCP serial number cyclically, and repeating the steps described above, where N is an integer and is initially equal to 0.

Optionally, in another embodiment, the processor 1060 is further configured to: receive a configuration command before reordering the PDCP data packet; and reorder a received and stored PDCP data packet.

Optionally, the processor 1060 is further configured to: upon receiving the configuration command, if it is determined that the serial number of the reordered PDCP data packet is inside the Reordering_Window, deliver the reordered PDCP data packet to the RoHC entity by using a second delivery mode. The second delivery mode includes: determining, in the serial number order of the reordered PDCP data packet, whether a PDCP data packet with the serial number of N is received in the Reordering_Window; if it is determined that a PDCP data packet with the serial number of N is received in the Reordering_Window, delivering the PDCP data packet with the serial number of N to the RoHC entity for header decompression; or if it is determined that a PDCP data packet with the serial number of N is not received in the Reordering_Window, ignoring the PDCP data packet with the serial number of N; incrementing N in order of PDCP serial number cyclically, and repeating the steps described above until header decompression of stored PDCP data is completed, where N is an integer and is initially equal to 0.

Optionally, the processor 1060 is further configured to: after delivering the reordered PDCP data packet to the RoHC entity in the serial number order of the reordered PDCP data packet, generate a status report to indicate a data packet that has not been successfully received, and transmit the status report to the PDCP transmitting end.

Optionally, the processor 1060 is further configured to: after transmitting the status report to the PDCP transmitting end, receive a PDCP data packet transmitted by the PDCP transmitting end based on the status report.

Optionally, the processor 1060 is further configured to: after execution of the configuration command is completed, determine, in the serial number order of the reordered PDCP data packet, whether the serial number N of the PDCP data packet delivered to the RoHC entity is the serial number subsequent to the last serial number of PDCP data packets in the Reordering_Window received by the PDCP receiving end before the execution of the configuration command is completed; or determine, in the serial number order of the reordered PDCP data packet, whether the serial number of the PDCP data packet received by the PDCP receiving end before the execution of the configuration command is completed is included in the Reordering_Window; if it is determined that the serial number N of the PDCP data packet delivered to the RoHC entity is the serial number subsequent to the last serial number of the PDCP data packets in the Reordering_Window received by the PDCP receiving end before the execution of the configuration command is completed, or if it is determined that the serial number of the PDCP data packet received by the PDCP receiving end before the execution of the configuration command is completed is not included in the Reordering_Window, deliver the reordered PDCP data packet to the RoHC entity by using the first delivery mode; if it is determined that the serial number N of the PDCP data packet delivered to the RoHC entity is not the serial number subsequent to the last serial number of the PDCP data packets in the Reordering_Window received by the PDCP receiving end before the execution of the configuration command is completed, or if it is determined that the serial number of the PDCP data packet received by the PDCP receiving end before the execution of the configuration command is completed is included in the Reordering_Window, deliver the reordered PDCP data packet to the RoHC entity by using a third delivery mode; increment N in order of PDCP serial number cyclically, and repeat the steps described above, where N is an integer and is initially equal to 0.

Optionally, the processor 1060 delivers the reordered PDCP data packet to the RoHC entity by using a third delivery mode, and the third delivery mode includes: determining whether a PDCP data packet with the serial number of N is received in the Reordering_Window; if it is determined that a PDCP data packet with the serial number of N is received in the Reordering_Window and it is determined that the PDCP data packet with the serial number of N has been delivered to the RoHC entity, ignoring the PDCP data packet with the serial number of N; or if it is determined that a PDCP data packet with the serial number of N is received in the Reordering_Window and it is determined that the PDCP data packet with the serial number of N has not been delivered to the RoHC entity, delivering the PDCP data packet with the serial number of N to the RoHC entity for header decompression; or if it is determined that a PDCP data packet with the serial number of N is not received in the Reordering_Window and it is determined that the PDCP data packet with the serial number of N has not been delivered to the RoHC entity, waiting until the PDCP data packet with the serial number of N is received in the Reordering_Window and delivering the data packet with the serial number of N to the RoHC entity; incrementing N in order of PDCP serial number cyclically, and repeating the steps described above, where N is an integer and is initially equal to 0.

Optionally, the processor 1060 is further configured to: after ignoring a PDCP data packet with the serial number of N if it is determined that the PDCP data packet with the serial number of N is received in the Reordering_Window and it is determined that the PDCP data packet with the serial number of N has been delivered to the RoHC entity, deliver the ignored PDCP data packet with the serial number of N to the RoHC entity, and obtain a data packet resulting from header decompression performed by the RoHC entity on the PDCP data packet; and if it is determined that the header-decompressed data packet includes a data packet that has already been header-decompressed, discard the header-decompressed data packet.

Optionally, the processor 1060 is further configured to: after obtaining a data packet resulting from header decompression performed by the RoHC entity on a reordered PDCP data packet if it is determined that the serial number of the PDCP data packet is outside the Reordering_Window, discard the header-decompressed data packet if it is determined that the header-decompressed data packet includes a data packet that has already been header-decompressed.

Optionally, the processor 1060 is further configured to: receive indication information transmitted by the PDCP transmitting end, the indication information including an identifier of compression mode and an identifier of RoHC entity, or including an identifier of RoHC entity, or including an identifier of compression mode; and deliver the reordered PDCP data packet to the RoHC entity, which including delivering the reordered PDCP data packet to an RoHC entity corresponding to the identifier of compression mode and the identifier of RoHC entity, or an RoHC entity corresponding to the identifier of RoHC entity, or an RoHC entity corresponding to the identifier of compression mode.

It can be seen that the mobile terminal 1000 may implement various processes implemented at the terminal-side equipment in the above embodiment and will not be described again to avoid repetition. The mobile terminal reorders at the PDCP layer data packets delivered out-of-order by a lower layer, and delivers the reordered data packets to the RoHC in different modes, thereby enabling accurate transmission of the PDCP data packets to the RoHC entity and further enabling correct header decompression of the data packets by the RoHC entity.

A person skilled in the art may be aware that, the exemplary units and algorithm steps described in connection with the embodiments disclosed in the present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present disclosure, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a removable hard disk, an ROM, an RAM, a magnetic disk, or an optical disc.

The embodiments described above are only some specific implementations of the present disclosure, the scope of the present disclosure is by no means limited thereto. Any changes or substitutions within the technical scope of the present disclosure that a person skilled in the art can readily contemplate shall fall within the scope of the present disclosure. Therefore, the scope of the present disclosure shall be defined by the claims.

What is claimed is:

1. A method of data processing, applied to a packet data convergence protocol (PDCP) layer, comprising:
   reordering a received PDCP data packet according to a serial number of the PDCP data packet;
   determining whether the serial number of the reordered PDCP data packet is inside or outside a Reordering Window, delivering the reordered PDCP data packet to a robust header compression (RoHC) entity in a serial number order of the reordered PDCP data packet, and obtaining a data packet resulting from header decompression performed by the RoHC entity on the PDCP data packet;
   wherein in the case that the serial number of the reordered PDCP data packet is inside the Reordering_Window, the delivering the reordered PDCP data packet to the RoHC entity in the serial number order of the reordered PDCP data packet comprises:
   delivering the reordered PDCP data packet to the RoHC entity by using a first delivery mode, wherein the first delivery mode comprises:
   determining, in the serial number order of the reordered PDCP data packet, whether a PDCP data packet with the serial number of N is received in the Reordering_Window;
   in the case that it is determined that the PDCP data packet with the serial number of N is received in the Reordering_Window, delivering the PDCP data packet with the serial number of N to the RoHC entity; or in the case that it is determined that the PDCP data packet with the serial number of N is not received in the Reordering_Window, waiting until the PDCP data packet with the serial number of N is received in the Reordering_Window and delivering the PDCP data packet with the serial number of N to the RoHC entity;
   incrementing N in order of PDCP serial number cyclically, and repeating the determining, in the serial number order of the reordered PDCP data packet, whether the PDCP data packet with the serial number of N is received in the Reordering_Window;
   wherein N is an integer and is initially equal to 0.

2. The method according to claim 1, wherein, before the reordering the received PDCP data packet, the method comprises:
   receiving a configuration command;
   the reordering the received PDCP data packet comprises:
   reordering a received and stored PDCP data packet.

3. The method according to claim 2, wherein after the receiving the configuration command, in the case that it is determined that the serial number of the reordered PDCP data packet is inside the Reordering_Window;
   the delivering the reordered PDCP data packet to the RoHC entity in the serial number order of the reordered PDCP data packet comprises:
   delivering the reordered PDCP data packet to the RoHC entity by using a second delivery mode, wherein the second delivery mode comprises:
   determining, in the serial number order of the reordered PDCP data packet, whether a PDCP data packet with the serial number of N is received in the Reordering_Window;
   in the case that it is determined that the PDCP data packet with the serial number of N is received in the Reordering_Window, delivering the PDCP data packet with the serial number of N to the RoHC entity for header decompression; or in the case that it is determined that the PDCP data packet with the serial number of N is not received in the Reordering_Window, ignoring the PDCP data packet with the serial number of N;
   incrementing N in order of PDCP serial number cyclically, and repeating the determining, in the serial number order of the reordered PDCP data packet, whether the PDCP data packet with the serial number of N is received in the Reordering_Window until header decompression of the stored PDCP data is completed;
   wherein N is an integer and is initially equal to 0.

4. The method according to claim 3, wherein, after the delivering, in the serial number order of the reordered PDCP data packet, the reordered PDCP data packet to the RoHC entity, the method further comprises:
   generating a status report to indicate a data packet that has not been successfully received;
   transmitting the status report to a PDCP transmitting end.

5. The method according to claim 4, wherein, after the transmitting the status report to the PDCP transmitting end, the method further comprises:
   receiving a PDCP data packet transmitted by the PDCP transmitting end based on the status report.

6. The method according to claim 2, wherein after execution of the configuration command is completed, the delivering, in the serial number order of the reordered PDCP data packet, the reordered PDCP data packet to the RoHC entity comprises:
   determining, in the serial number order of the reordered PDCP data packet, whether the serial number N of the PDCP data packet delivered to the RoHC entity is a serial number subsequent to a last serial number of PDCP data packets in the Reordering_Window received by a PDCP receiving end before the execution of the configuration command is completed; or
   determining, in the serial number order of the reordered PDCP data packet, whether the serial number of the PDCP data packet received by the PDCP receiving end before the execution of the configuration command is completed is included in the Reordering_Window; in the case that it is determined that the serial number N of the PDCP data packet delivered to the RoHC entity is the serial number subsequent to the last serial number of the PDCP data packets in the Reordering_Window received by the PDCP receiving end before the execution of the configuration command is completed, or in the case that it is determined that the serial number of the PDCP data packet received by the PDCP receiving end before the execution of the configuration command is completed is not included in the Reordering_Window, delivering the reordered PDCP data packet to the RoHC entity by using the first delivery mode;

in the case that it is determined that the serial number N of the PDCP data packet delivered to the RoHC entity is not the serial number subsequent to the last serial number of the PDCP data packets in the Reordering_Window received by the PDCP receiving end before the execution of the configuration command is completed, or in the case that it is determined that the serial number of the PDCP data packet received by the PDCP receiving end before the execution of the configuration command is completed is included in the Reordering_Window, delivering the reordered PDCP data packet to the RoHC entity by using a third delivery mode;

incrementing N in order of PDCP serial number cyclically, and repeating the determining, in the serial number order of the reordered PDCP data packet, whether the serial number N of the PDCP data packet delivered to the RoHC entity is the serial number subsequent to the last serial number of the PDCP data packets in the Reordering_Window received by the PDCP receiving end before the execution of the configuration command is completed, or repeating the determining, in the serial number order of the reordered PDCP data packet, whether the serial number of the PDCP data packet received by the PDCP receiving end before the execution of the configuration command is completed is included in the Reordering_Window;

wherein N is an integer and is initially equal to 0.

7. The method according to claim 6, wherein the delivering the reordered PDCP data packet to the RoHC entity by using the third delivery mode comprises:

determining whether the PDCP data packet with the serial number of N is received in the Reordering_Window, and in the case that it is determined that the PDCP data packet with the serial number of N is received in the Reordering_Window and it is determined that the PDCP data packet with the serial number of N has been delivered to the RoHC entity, ignoring the PDCP data packet with the serial number of N; or in the case that it is determined that the PDCP data packet with the serial number of N is received in the Reordering_Window and it is determined that the PDCP data packet with the serial number of N has not been delivered to the RoHC entity, delivering the PDCP data packet with the serial number of N to the RoHC entity for header decompression; or in the case that it is determined that the PDCP data packet with the serial number of N is not received in the Reordering_Window and it is determined that the PDCP data packet with the serial number of N has not been delivered to the RoHC entity, waiting until the PDCP data packet with the serial number of N is received in the Reordering_Window and delivering the data packet with the serial number of N to the RoHC entity;

incrementing N in order of PDCP serial number cyclically, and repeating the determining whether the PDCP data packet with the serial number of N is received in the Reordering_Window;

wherein N is an integer and is initially equal to 0.

8. The method according to claim 7, wherein, after the in the case that it is determined that the PDCP data packet with the serial number of N is received in the Reordering_Window and it is determined that the PDCP data packet with the serial number of N has been delivered to the RoHC entity, ignoring the PDCP data packet with the serial number of N, the method further comprises:

delivering the ignored PDCP data packet with the serial number of N to the RoHC entity and obtaining a data packet resulting from header decompression performed by the RoHC entity on the PDCP data packet; in the case that it is determined that the header-decompressed data packet includes a data packet that has already been header-decompressed, discarding the header-decompressed data packet.

9. The method according to claim 1, wherein, in the case that it is determined that the serial number of the reordered PDCP data packet is outside the Reordering_Window, after the obtaining the data packet resulting from header decompression performed by the RoHC entity on the PDCP data packet, the method further comprises:

in the case that it is determined that the header-decompressed data packet includes a data packet that has already been header-decompressed, discarding the header-decompressed data packet.

10. The method according to claim 1, further comprising:

receiving indication information transmitted by a PDCP transmitting end;

wherein the indication information comprises: an identifier of compression mode and an identifier of RoHC entity; or comprises an identifier of RoHC entity; or comprises an identifier of compression mode;

the delivering the reordered PDCP data packet to the RoHC entity comprises:

delivering the reordered PDCP data packet to an RoHC entity corresponding to the identifier of compression mode and the identifier of RoHC entity, or an RoHC entity corresponding to the identifier of RoHC entity, or an RoHC entity corresponding to the identifier of compression mode.

11. An apparatus of data processing, comprising a processor and a storage, wherein the storage is configured to store a program, the processor is configured to call the program stored in the storage, to implement following steps:

reordering a received PDCP data packet according to a serial number of the PDCP data packet;

determining whether the serial number of the reordered PDCP data packet is inside or outside a Reordering_Window, delivering the reordered PDCP data packet to a robust header compression (RoHC) entity in a serial number order of the reordered PDCP data packet, and obtaining a data packet resulting from header decompression performed by the RoHC entity on the PDCP data packet;

wherein the processor is further configured to call the program stored in the storage, to implement following steps:

in the case that the serial number of the reordered PDCP data packet is inside the Reordering_Window, delivering the reordered PDCP data packet to the RoHC entity by using a first delivery mode, wherein the first delivery mode comprises:

determining, in the serial number order of the reordered PDCP data packet, whether a PDCP data packet with the serial number of N is received in the Reordering_Window;

in the case that it is determined that the PDCP data packet with the serial number of N is received in the Reordering_Window, delivering the PDCP data packet with the serial number of N to the RoHC entity; or in the case that it is determined that the PDCP data packet with the serial number of N is not received in the Reordering_Window, waiting until the PDCP data packet with the serial number of N is received in the Reordering_Window and delivering the PDCP data packet with the serial number of N to the RoHC entity;

incrementing N in order of PDCP serial number cyclically, and repeating the determining, in the serial number order of the reordered PDCP data packet, whether the PDCP data packet with the serial number of N is received in the Reordering_Window;

wherein N is an integer and is initially equal to 0.

12. The apparatus of data processing according to claim 11, wherein the processor is further configured to call the program stored in the storage, to implement following steps:

before the reordering the received PDCP data packet, receiving a configuration command;

reordering a received and stored PDCP data packet.

13. The apparatus of data processing according to claim 12, wherein the processor is further configured to call the program stored in the storage, to implement following steps:

after the receiving the configuration command, in the case that it is determined that the serial number of the reordered PDCP data packet is inside the Reordering_Window;

delivering the reordered PDCP data packet to the RoHC entity by using a second delivery mode, wherein the second delivery mode comprises:

determining, in the serial number order of the reordered PDCP data packet, whether a PDCP data packet with the serial number of N is received in the Reordering_Window;

in the case that it is determined that the PDCP data packet with the serial number of N is received in the Reordering_Window, delivering the PDCP data packet with the serial number of N to the RoHC entity for header decompression; or in the case that it is determined that the PDCP data packet with the serial number of N is not received in the Reordering_Window, ignoring the PDCP data packet with the serial number of N;

incrementing N in order of PDCP serial number cyclically, and repeating the determining, in the serial number order of the reordered PDCP data packet, whether the PDCP data packet with the serial number of N is received in the Reordering_Window until header decompression of the stored PDCP data is completed;

wherein N is an integer and is initially equal to 0.

14. The apparatus of data processing according to claim 13, wherein the processor is further configured to call the program stored in the storage, to implement following steps:

after the delivering, in the serial number order of the reordered PDCP data packet, the reordered PDCP data packet to the RoHC entity, generating a status report to indicate a data packet that has not been successfully received;

transmitting the status report to a PDCP transmitting end.

15. The apparatus of data processing according to claim 12, wherein the processor is further configured to call the program stored in the storage, to implement following steps:

after execution of the configuration command is completed, determining, in the serial number order of the reordered PDCP data packet, whether the serial number N of the PDCP data packet delivered to the RoHC entity is a serial number subsequent to a last serial number of PDCP data packets in the Reordering_Window received by a PDCP receiving end before the execution of the configuration command is completed; or determining, in the serial number order of the reordered PDCP data packet, whether the serial number of the PDCP data packet received by the PDCP receiving end before the execution of the configuration command is completed is included in the Reordering_Window; in the case that it is determined that the serial number N of the PDCP data packet delivered to the RoHC entity is the serial number subsequent to the last serial number of the PDCP data packets in the Reordering_Window received by the PDCP receiving end before the execution of the configuration command is completed, or in the case that it is determined that the serial number of the PDCP data packet received by the PDCP receiving end before the execution of the configuration command is completed is not included in the Reordering_Window, delivering the reordered PDCP data packet to the RoHC entity by using the first delivery mode;

in the case that it is determined that the serial number N of the PDCP data packet delivered to the RoHC entity is not the serial number subsequent to the last serial number of the PDCP data packets in the Reordering_Window received by the PDCP receiving end before the execution of the configuration command is completed, or in the case that it is determined that the serial number of the PDCP data packet received by the PDCP receiving end before the execution of the configuration command is completed is included in the Reordering_Window, delivering the reordered PDCP data packet to the RoHC entity by using a third delivery mode;

incrementing N in order of PDCP serial number cyclically, and repeating the determining, in the serial number order of the reordered PDCP data packet, whether the serial number N of the PDCP data packet delivered to the RoHC entity is the serial number subsequent to the last serial number of the PDCP data packets in the Reordering_Window received by the PDCP receiving end before the execution of the configuration command is completed, or repeating the determining, in the serial number order of the reordered PDCP data packet, whether the serial number of the PDCP data packet received by the PDCP receiving end before the execution of the configuration command is completed is included in the Reordering_Window;

wherein N is an integer and is initially equal to 0.

16. The apparatus of data processing according to claim 15, wherein the third delivery mode comprises:

determining whether the PDCP data packet with the serial number of N is received in the Reordering_Window, and in the case that it is determined that the PDCP data packet with the serial number of N is received in the Reordering_Window and it is determined that the PDCP data packet with the serial number of N has been delivered to the RoHC entity, ignoring the PDCP data packet with the serial number of N; or in the case that it is determined that the PDCP data packet with the serial number of N is received in the Reordering_Window and it is determined that the PDCP data packet with the serial number of N has not been delivered to the RoHC entity, delivering the PDCP data packet with the serial number of N to the RoHC entity for header decompression; or in the case that it is determined that the PDCP data packet with the serial number of N is not received in the Reordering_Window and it is determined that the PDCP data packet with the serial number of N has not been delivered to the RoHC entity, waiting until the PDCP data packet with the serial number of N is received in the Reordering_Window and delivering the data packet with the serial number of N to the RoHC entity;

incrementing N in order of PDCP serial number cyclically, and repeating the determining whether the PDCP data packet with the serial number of N is received in the Reordering_Window;

wherein N is an integer and is initially equal to 0.

17. The apparatus of data processing according to claim 11, wherein the processor is further configured to call the program stored in the storage, to implement following steps: in the case that it is determined that the serial number of the reordered PDCP data packet is outside the Reordering_Window, in the case that it is determined that the header-decompressed data packet includes a data packet that has already been header-decompressed, discarding the header-decompressed data packet.

18. The apparatus of data processing according to claim 11, wherein the processor is further configured to call the program stored in the storage, to implement following steps:

receiving indication information transmitted by a PDCP transmitting end;

wherein the indication information comprises: an identifier of compression mode and an identifier of RoHC entity; or comprises an identifier of RoHC entity; or comprises an identifier of compression mode;

the delivering the reordered PDCP data packet to the RoHC entity comprises:

delivering the reordered PDCP data packet to an RoHC entity corresponding to the identifier of compression mode and the identifier of RoHC entity, or an RoHC entity corresponding to the identifier of RoHC entity, or an RoHC entity corresponding to the identifier of compression mode.

19. A non-transitory computer readable storage medium storing therein a computer program, wherein the computer program is configured to be executed by a processor, to implement the steps of:

reordering a received PDCP data packet according to a serial number of the PDCP data packet;

determining whether the serial number of the reordered PDCP data packet is inside or outside a Reordering_Window, delivering the reordered PDCP data packet to a robust header compression (RoHC) entity in a serial number order of the reordered PDCP data packet, and obtaining a data packet resulting from header decompression performed by the RoHC entity on the PDCP data packet;

wherein in the case that the serial number of the reordered PDCP data packet is inside the Reordering_Window, the delivering the reordered PDCP data packet to the RoHC entity in the serial number order of the reordered PDCP data packet comprises:

delivering the reordered PDCP data packet to the RoHC entity by using a first delivery mode, wherein the first delivery mode comprises:

determining, in the serial number order of the reordered PDCP data packet, whether a PDCP data packet with the serial number of N is received in the Reordering_Window;

in the case that it is determined that the PDCP data packet with the serial number of N is received in the Reordering_Window, delivering the PDCP data packet with the serial number of N to the RoHC entity; or in the case that it is determined that the PDCP data packet with the serial number of N is not received in the Reordering_Window, waiting until the PDCP data packet with the serial number of N is received in the Reordering_Window and delivering the PDCP data packet with the serial number of N to the RoHC entity;

incrementing N in order of PDCP serial number cyclically, and repeating the determining, in the serial number order of the reordered PDCP data packet, whether the PDCP data packet with the serial number of N is received in the Reordering_Window;

wherein N is an integer and is initially equal to 0.

20. The non-transitory computer readable storage medium according to claim 19, wherein the computer program is configured to be executed by the processor, to implement the steps of:

receiving a configuration command:

the reordering the received PDCP data packet comprises:
reordering a received and stored PDCP data packet.

* * * * *